DATA STORAGE AND RETRIEVAL APPARATUS UTILIZING REFLECTED LIGHT FROM A SINGLE OPTICAL SOURCE

Filed April 15, 1968 3 Sheets-Sheet 1

Inventor:
Richard C. Raymond,
by Marvin Snyder
His Attorney.

Inventor:
Richard C. Raymond,
by Marvin Snyder
His Attorney.

Inventor:
Richard C. Raymond,
by Marvin Snyder
His Attorney.

3,535,684

DATA STORAGE AND RETRIEVAL APPARATUS UTILIZING REFLECTED LIGHT FROM A SINGLE OPTICAL SOURCE

Richard C. Raymond, New York, N.Y., assignor to General Electric Company, a corporation of New York Filed Apr. 15, 1968, Ser. No. 721,454
Int. Cl. G11b *7/08, 7/24, 15/02*
U.S. Cl. 340—173 4 Claims

ABSTRACT OF THE DISCLOSURE

Graphic data storage and retrieval are accomplished rapidly by using a flying spot scanner for recording data on a photosensitive recording medium. To minimize system complexity, the same flying spot scanner is used for reading out the medium by scanning the medium with a light beam and detecting impingement of the light beam emanating from the medium on an image plane comprising photodetecting means. To achieve rapidity of operation, the recording medium comprises photoconductive thermoplastic film, enabling successive record and readout operations without removing the film from its guide track.

This invention relates to data storage and retrieval apparatus, and more particularly to apparatus for optically recording data and optically retrieving data from storage by employment of a single scanning light source for both operations.

Data storage and retrieval systems have long employed optical apparatus to facilitate rapid storage and retrieval of data in graphic form. Typically, such system includes an optical storage medium, means for recording data on the medium in optical form, and means for retrieving recorded data. To function properly, the data recording apparatus and the data retrieval apparatus used with the optical storage medium have heretofore comprised separate entities. However, where more than one function can be performed by a single apparatus, a reduction in system complexity and a concomitant saving in system cost can be achieved.

The present invention concerns a simplified system for recording and retrieving data through employment of a single scanning light source for both recording and reading out data. By employing a photoconductive thermoplastic film as the recording medium, recording, developing and readout operations can all take place without removing the film from its guide track at any time. Accordingly, speed of operation is greatly increased, since precise alignment of the film within its guide track remains undisturbed. The high degree of mechanical transport precision attainable thereby facilitates convenient positioning of any selected frame in an optical readout location, permitting coordinate determination of data thereon to a high degree of reliability. This is especially advantageous when the optical data storage and retrieval apparatus of the instant invention is employed at a computer terminal.

Accordingly, one object of the invention is to provide apparatus for rapidly storing and retrieving data in graphical form with a high degree of reliability.

Another object is to provide apparatus wherein data may be optically recorded and optically read out in immediate succession without requiring intervening removal of the medium from the apparatus.

Another object is to provide apparatus for storing and retrieving data wherein a single flying spot scanner at times is controllably operated to record data on a light sensitive recording medium and at other times is operated to read stored data out of the recording medium.

Briefly, in accordance with a preferred embodiment of the invention, a graphic data storage and retrieval system is provided. The system includes a graphic data recording medium and flying spot scanner means illuminating a portion of the medium. Circuit means coupled to the flying spot scanner means are provided for at times controllably positioning the optical energy emitted by the flying spot scanner means on the surface of the recording medium and at other times directing the optical energy emitted by the flying spot scanner means in readout fashion over the surface of the recording medium. Photodetector means responsive to optical energy emanating from the recording medium during those times in which the optical energy emitted by the flying spot scanner means is directed in readout fashion are also provided for reading out data stored on the recording medium. The optical energy referred to herein includes electromagnetic radiation of wavelength falling within the visible, infrared and ultraviolet portions of the electromagnetic radiation spectrum.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
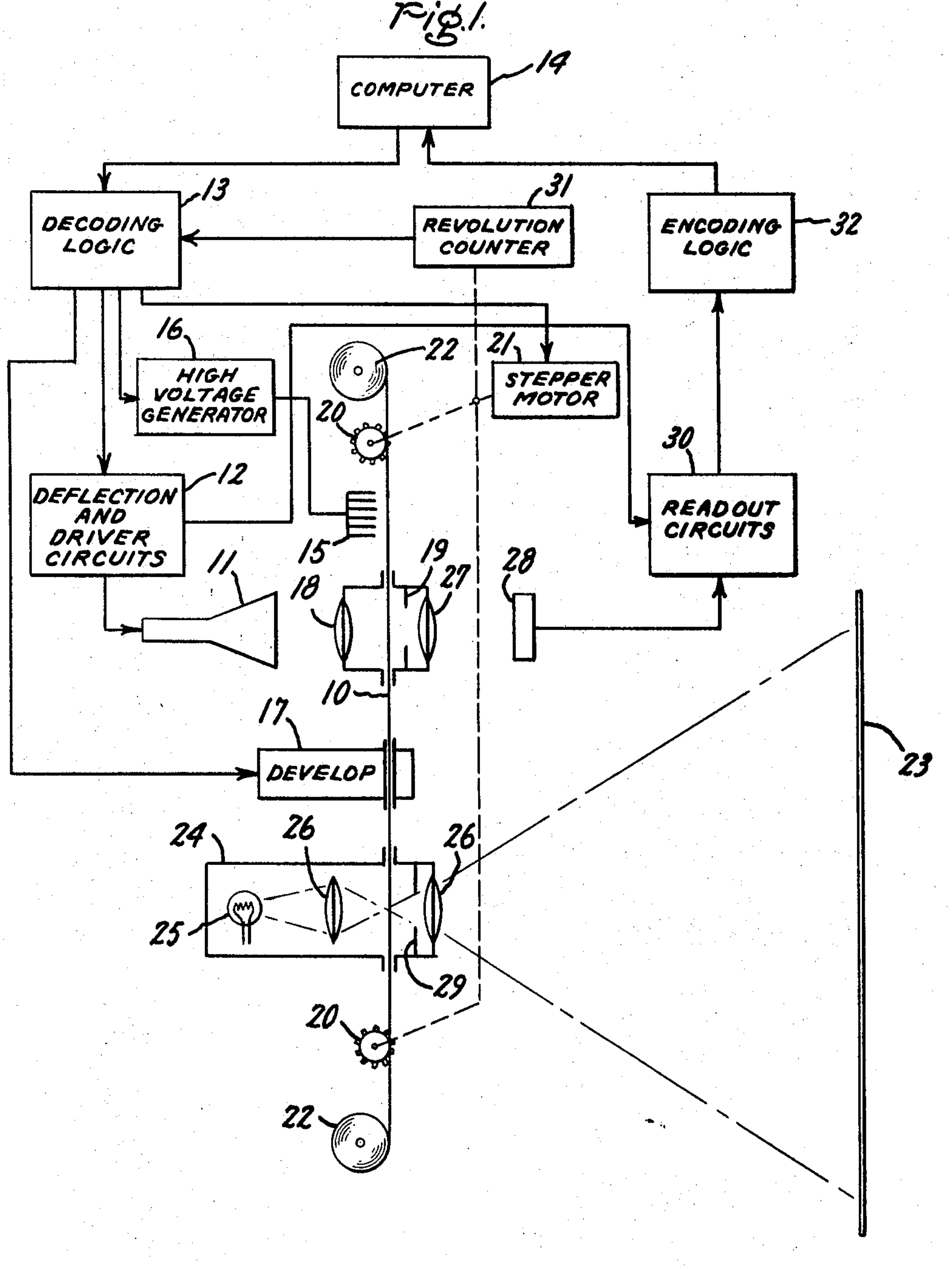
FIG. 1 is a schematic diagram of the graphic data storage and retrieval apparatus of the instant invention.

In FIG. 1, an optical recording medium comprising a photosensitive film 10, such as the thermoplastically deformable photoconductive material on a flexible transparent base shown and described in J. Gaynor Pat. 3,291,601 issued Dec. 13, 1966 and assigned to the instant assignee, is shown. Film comprised of this deformable photoconductive material is employed for recording deformation images thereon. Recording is accomplished by controllably deflecting a spot of light over the surface of film 10. Preferably, the spot of light originates with a flying spot scanner 11 as controlled by deflection and driver cricuits 12 responsive to decoding logic 13 comprising circuits actuated in accordance with signals which may be received from a computer 14. The flying spot scanner frequency response is sufficiently high to avoid adding a detrimental delay in operation of the recording and readout apparatus. A lens 18 is employed in conjunction with flying spot scanner 11 in order to focus the spot on the surface of film 10.

A high voltage electrostatic field, produced by a plurality of wire electrodes 15, results in establishment of a uniform electrical charge over the surface of the portion of film 10 positioned beneath the electrodes. The electrodes are coupled to a high voltage generator 16 which is actuated by decoding logic 13 when the system if operated in the recording mode. Similarly, a film developing station 17 which heats film 10 in order to allow the thermoplastic material thereof to deform under the influence of an electrical charge thereon, is actuated by decoding logic 13.

Film 10 is precisely positioned by means of a pair of sprocket wheels 20 driven in unison by a reversible stepper motor 21 in accordance with signals from decoding logic 13. A revolution counter 31 coupled to stepper motor 21 provides decoding logic 13 with feedback signals corresponding to the position of the stepper motor. Reels 22 may be driven by a reversible motor and overrunning clutch combination (not shown) synchronized with stepper motor 21 in order to take up any slack in the film. Images recorded on the film may be projected onto a viewing screen 23 from a projector 24 containing a projection lamp 25 and a pair of focusing lenses 26. Projector 24 preferably contains a stop 29 characteristic of Schlieren optics type systems in order to make visible the deformation images on film 10 without need for converting the phase images thereon into amplitude images on a film.

When the ssytem is operated in the readout mode, light emanating from film 10 is focused through a Schlieren optics type stop 19 and a lens 27 onto a photocell 28. Photocell 28 drives readout circuits 30 in order to supply information to encoding logic 32 and thence to computer 14. Thus, decoding logic 13 and encoding logic 32 comprise demodulation and modulation apparatus, respectively, for the type of pulse modulated signals transmitted and received by computer 14. Readout circuits 30 are controlled by deflection and driver circuits 12 so as to permit energization from photocell 28 only when flying spot scanner 11 is operated in its readout mode.

Recording is initiated when computer 14 transmits to decoding logic 13 a signal corresponding to data to be recorded. This signal turns on high voltage generator 16 so as to establish a uniform charge on the surface of film 10 as the film passes beneath electrodes 15. The film is then advanced in accordance with operation of stepper motor 21, as determined by decoding logic 13, so as to position a uniformly charged portion of film 10 in front of flying spot scanner 11. A deflection voltage is then applied to flying spot scanner 11 in accordance with output signals from deflection and driver circuits 12 so as to aim the spot of light to be produced by flying spot scanner 11 at a location determined by data from computer 14. Each time the spot of light to be produced by flying spot scanner 11 has been aimed at the desired location by virtue of deflection voltages applied to the flying spot scanner, a signal from deflection and driver circuits 12 actuates the flying spot scanner to emit a spot of light. Each spot of light emitted by flying spot scanner 11 is focused by lens 18 onto the electrically charged portion of the surface of film 10. As described in the aforementioned J. Gaynor Pat. 3,291,601, impingement of each spot of light upon the surface of film 10 selectively discharges the electrical charge on the surface of the film so as to create regions which are essentially uncharged in the midst of the charged area.

After the film has been selectively discharged in accordance with data to be stored, decoding logic 13 actuates stepper motor 21 to advance the selectively discharged portion of film 10 to developing station 17. In this location, the film is heated by a heater energized in accordance with a signal from decoding logic 13. The thermoplastic medium on film 10 is thereupon converted to a viscous liquid, allowing it to deform in accordance with the charge pattern thereon. Subsequent cooling to room temperature, either by further advancement of the film or by de-energization of the heating element at developing station 17, then causes the thermoplastic medium on film 10 to solidify and freeze the deformation image therein. Thereafter, film 10 may be advanced further so that the deformation image may enter projector 24 for the purpose of displaying the recorded image on viewing screen 23, enabling recording of an additional image on film 10 while the recorded image is being viewed on screen 23. Each advance of stepper motor 21 advances film 10 by a single frame or a multiple of single frames so that precise positioning of film 10 may be achieved. After each image has been recorded, and following viewing of the recorded image if viewing has taken place, stepper motor 21 advances film 10 so that the recorded images are stored on the film rolled onto reels 22.

In readout operation, decoding logic 13 drives stepper motor 21 so as to situate a frame selected by computer 14 precisely between lenses 18 and 27 for illumination by flying spot scanner 11. Revolution counter 31 furnishes feedback signals to decoding logic 13 so as to confirm the position of stepper motor 21 as being that required by the computer. Once film 10 has been positioned, deflection and driver circuits 12 actuate flying spot scanner 11 to scan a complete raster. During this raster scan, readout circuits 30 are driven in synchronism with the swept beam of flying spot scanner 11, so that each output signal produced by photocell 28 in response to impingement of light thereon is coordinated with the sweep of the light beam. This enables the signal produced by readout circuits 30 to provide data regarding the precise position of the output spot of light produced by flying spot scanner 11 at the time it is transmitted through film 10 to photocell 28. The Schlieren optics provided by grating 19 permit readout of the deformation image in the manner described in aforementioned J. Gaynor Pat. 3,291,601.

Data on film 10 being read out are supplied by readout circuits 30 to encoding logic 32 wherein the signal is modulated in accordance with the type of pulse modulation employed by computer 14. The signal is then transmitted from encoding logic 32 to computer 14. In order to establish a reference point during readout of each frame on film 10, an optical recognition sgnal may be recorded on the frame in a predetermined location, such as in one of the corners. Thus, even though flying spot scanner 11 may be scanning a raster on a recorded frame of film 10, readout circuits 30 are prevented from accepting validity of the readout signal until the recognition signal has first been located. Thereafter, by continuing to scan the raster, the recorded signal is furnished to readout circuits 30. In this fashion, data recorded on film 10 may be subsequently read out without first requiring removal of the film from the system in order to develop the data recorded thereon.

Figure 2:
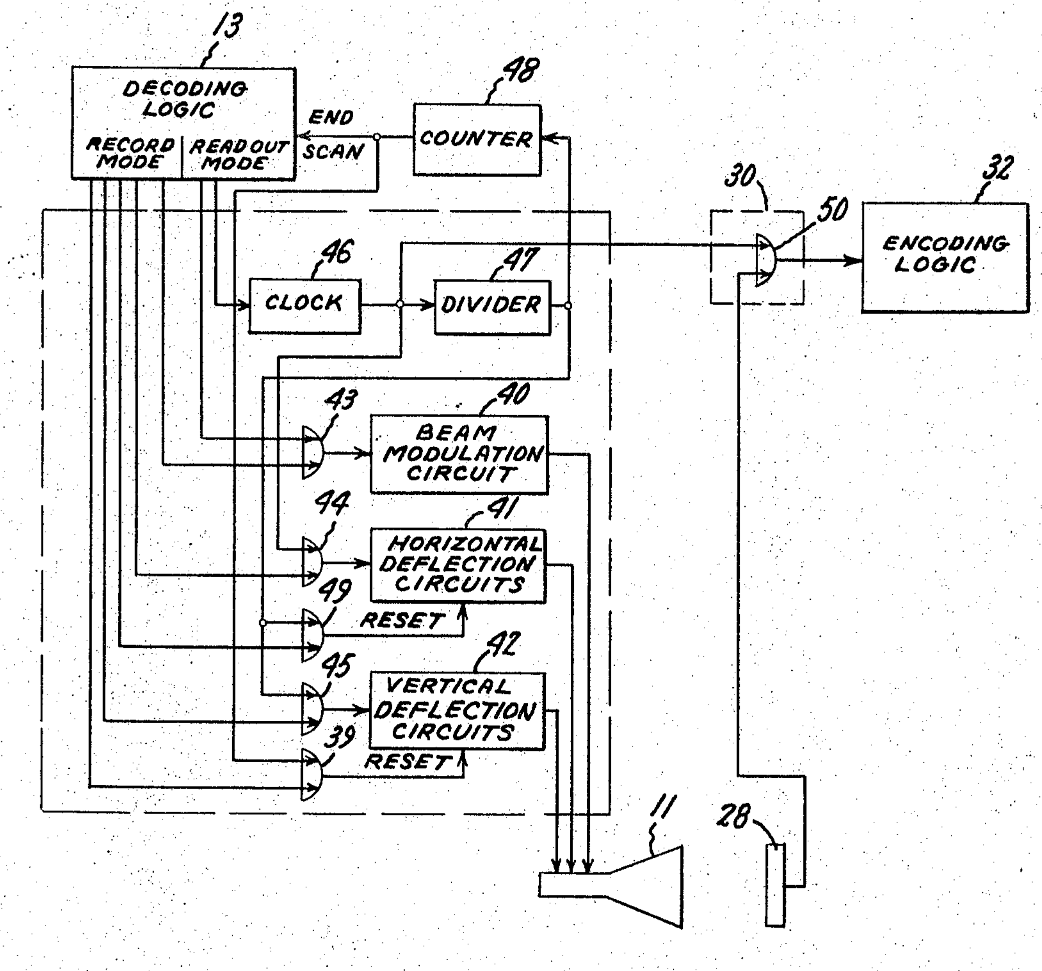
FIG. 2 is a block diagram of the control circuits of FIG. 1 for operating the flying spot scanner of the instant invention in the record and raster scanning readout modes.

In FIG. 2, the deflection and driver circuits 12 and readout circuits 30 of FIG. 1 are shown in greater detail. Thus, deflection and driver circuits 30 include a beam modulation circuit 40 coupled to a grid of flying spot scanner 11 for controllably permitting electron impingement from the cathode ray within the tube of scanner 11 upon the fluorescent screen thereof in order to produce a spot of light at the desired time. Horizontal deflection circuits 41 and vertical deflection circuits 42 are also provided, in order to control the voltage on deflection electrodes within the tube of scanner 11 and hence location of the spot of light on the fluorescent screen thereof in a manner well known to those skilled in the art. Circuits 41 and 42 typically comprise staircase counters, or digital-to-analog converters, increasing their output voltage in accordance with the number of input pulses received, until being reset by a reset signal from decoding logic 13. Horizontal deflection circuits 41 are reset by output signals from a 2-input OR circuit or gate 49, one input of which is fulfilled by an output signal from decoding logic 13 when in the record mode, while vertical deflection circuits 42 are reset by output signals from a 2-input OR circuit or gate 39, one input of which is similarly fulfilled by an output signal from decoding logic 13 when in the record mode. Each of circuits 40, 41 and 42 is energized by a 2-input OR circuit or gate 43, 44 and 45, respectively. One input to each of OR circuits 34, 44 and 45 is fulfilled by a respective output signal from decoding logic 13 when in the recording mode. Thus, when data is being recorded on film 10 of FIG. 1, each of circuits 40, 41 and 42 is actuated directly from decoding logic 13 so as to record the desired graphic images on film 10.

In the readout mode, flying spot scanner 11 is driven in raster fashion, as described in conjunction with the system of FIG. 1. Thus, the second input to OR gate 43 is energized directly from decoding logic 13 so as to maintain full intensity of the cathode ray within flying spot scanner 11. A clock pulse generator 46 is also driven by decoding logic 13 when in the readout mode so as to supply pulses to the second input to OR gate 44, thereby actuating horizontal deflection circuits 41 to sweep a horizontal line in discrete increments. A divider circuit 47, driven by clock pulse generator 46, furnishes an output signal to the second input of OR gate 45, thereby advancing vertical deflection circuits 42 by a single increment each time a sufficient number of pulses equivalent to the number of pulses required to sweep a horizontal line on the face of flying spot scanner 11, have been counted. Simultaneously, divider circuit 47 energizes the second input to OR gate 49, thereby resetting horizontal deflection circuits 41 so that the next horizontal line of the raster may be begun at its starting point. Output signals from divider circuit 47 are also furnished to a modulus counter 48 which produces an output signal after a predetermined number of output pulses have been supplied by divider circuit 47 equal to the number of horizontal lines to be generated in each raster on the face of flying spot scanner 11. The output signal of counter 48 actuates decoding logic 13 to halt scanning on the face of flying spot scanner 11, and energizes the second input to OR gate 39, thereby resetting vertical deflection circuits 42 so that the first horizontal line of the next raster to be generated will appear in the starting position on the raster.

Pulses produced by clock pulse generator 46 are supplied to readout circuits 30, permitting synchronization of output signals from photocell 28 therewith. Readout circuits 30 comprise a 2-input AND circuit or gate 50 having one input fulfilled by output signals from photocell 28 and a second input fulfilled by output signals from clock pulse generator 46. Accordingly, encoding logic 32 is actuated by each output pulse from photocell 28 which coincides with a clock pulse from clock generator 46 when decoding logic 13 is operated in its readout mode.

Figure 3A:
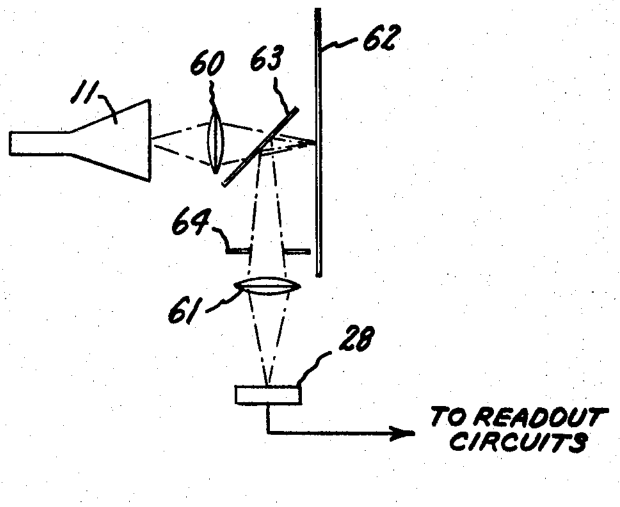
FIGS. 3A and 3B are schematic diagrams of optical apparatus for recording on and reading out of a reflective recording medium.
Figure 3B:
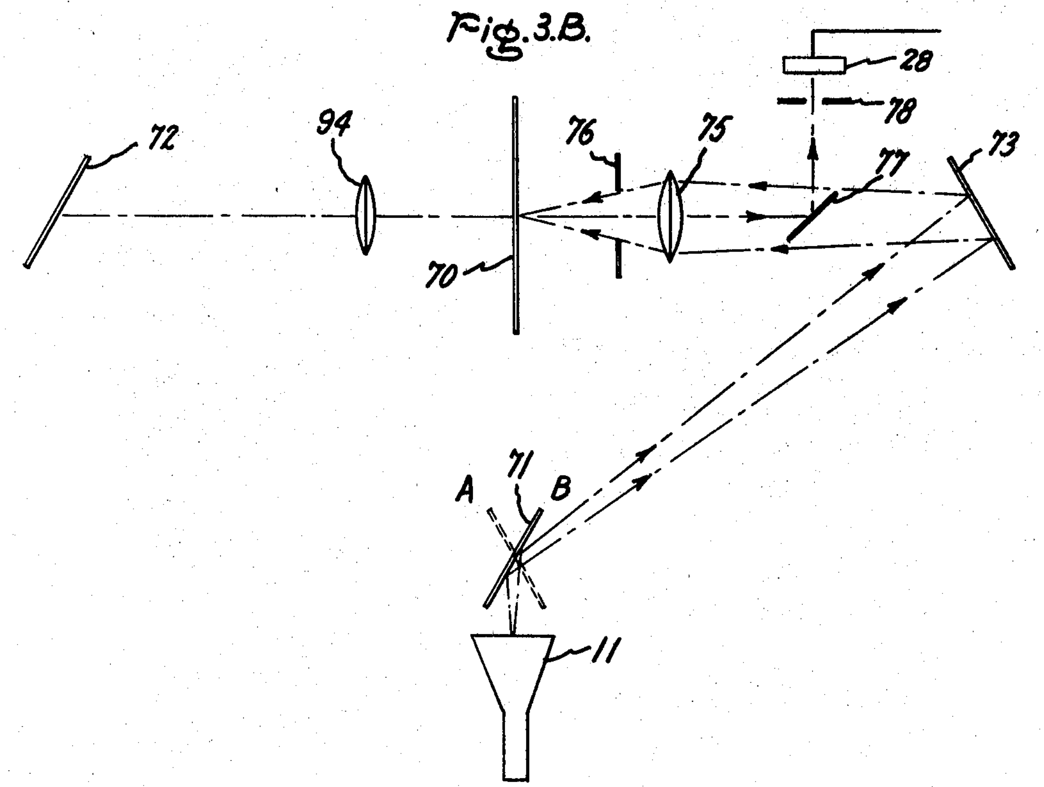

FIGS. 3A and 3B illustrate optical apparatus for reading out data into and out of a reflective recording medium of the photoconductive thermoplastic type such as described by James F. Burgess in U.S. patent application Ser. No. 418,339, now Pat. No. 3,415,681, filed Dec. 14, 1964 and assigned to in the instant assignee. Thus, in FIG. 3A, flying spot scanner 11 writes data on recording medium 62, which is of the type described in the aforementioned Burgess application, by imaging the light spot emitted therefrom through a focusing lens 60 and a half-silvered mirror or beam splitter 63, onto reflecting photoconductive thermoplastic film 62. The readout optics include a Schlieren optics type stop 64 between half-silvered mirror 63 and a lens 61 which focuses light onto photodetector 28. Readout is accomplished by activating photodetector 28 so that light emitted by flying spot scanner 11 and reflected from film 62 is reflected by beam splitter 63 through stop 64 and lens 61 onto photodetector 28. The electrical apparatus associated with the optics illustrated in FIG. 3A is essentially identical to that shown in FIGS. 1 and 2.

FIG. 3B concerns optical apparatus for accomplishing both recording and readout of data wherein the recording medium is a photoconductive thermoplastic film 70 of the reflective type, as in FIG. 3A, but wherein recording is achieved by directing light onto one side of the film and readout is achieved by directing light onto the opposite side of the film. To perform these functions, flying spot scanner 11 is mounted so as to direct its spot of light toward the edge of recording film 70. A mirror 71, pivotally mounted about its center, is positioned in front of flying spot scanner 11 so as to direct emitted light from the flying spot scanner toward a recording mirror 72 when in position A or toward a readout mirror 73 when in position B. A recording lens 94 is positioned between mirror 72 and film 70 so as to focus light from mirror 72 onto one side of film 70, designated the recording side. Similarly, a readout lens 75 is situated between mirror 73 and film 70 so as to focus light from mirror 73 onto the opposite side of film 70, designated the readout side. A Schlieren optics type stop 76 is situated between lens 75 and film 70, and functions to convert phase images to amplitude images in the manner described previously. Light reflected substantially orthogonally from film 70 through lens 75 is additionally reflected by a mirror 77 through a stop 78 onto a photodetector 28. Thus, only light which is reflected primarily in a direction perpendicular to film 70 passes back through readout lens 75 onto photodetector 28; however, light which is reflected at angles other than substantially perpendicular to the film, due to the deformations or wrinkles in the film, either misses readout lens 75 entirely or fails to pass through stop 78 to photodetector 28. Stop 78 thus adds selectively to the readout optics.

When mirror 71 is in its writing position, designated A, light from flying spot scanner 11 forms an image on the recording side of film 70, thereby establishing data on the film. When mirror 71 is in its readout position, designated B, light reflected orthogonally from the readout side of film 70 is detected by photodetector 28. The electrical apparatus associated with the optics of FIG. 3B is essentialy identical to that shown in FIGS. 1 and 2; however, mirror 71 may be positioned in either recording position A or readout position B by additional electromechanical apparatus actuated by the decoding logic circuitry 13 shown in FIGS. 1 and 2, if desired.

In the instant invention, data alternatively may be recorded by the flying spot scanner in the form of lines on the recording medium. These lines may then be read out using line-following apparatus, such as is well-known in the art, to control deflection of the light beam produced by flying spot scanner 11. Thus, in this mode of operation also, the same flying spot scanner 11 is employed for both recording and readout. In addition, computer 14, shown in FIG. 1, may be utilized to ensure displacement of the light beam over the entire line being traced and to enhance readout accuracy in the event a large plurality of closely-spaced lines have been recorded on the photosensitive medium.

The foregoing describes apparatus for rapidly recording and retrieving data in graphical form with a high degree of reliability. The apparatus permits optical recording and readout in immediate succession without requiring intervening removal of the medium from the apparatus. A single flying spot scanner employed in the apparatus is at times controllably operated to record data on the light sensitive recording medium and at other times operated to read stored data out of the recording medium.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

I claim:

1. An optical data storage and retrieval apparatus comprising a light sensitive recording medium, light emitting means capable of controllably directing light energy emitted therefrom, said light emitting means being disposed relative to said recording medium to cast light in a direction parallel to the plane of said recording medium, first reflective means pivotably positioned intermediate said light emitting means and said recording medium, second and third reflective means disposed on opposite sides of said recording medium, said second and third reflective means being positioned relative to said first reflective means to reflect light from said first reflective means at a perpendicular attitude relative to the plane of said recording medium, circuit means coupled to said light emitting means for controllably positioning the topical energy emitted from said light emitting means with said first reflective means disposed in a first pivotal position, said controllably positioned optical energy being reflected by said first and second reflective means to impinge orthogonally upon a first face of said recording medium, means for developing said selectively irradiated medium, means for operating said circuit means in an alternate mode to traverse the optical energy emitted by said light emitting means in a predetermined pattern with said first reflective means in a second pivotal position, said pattern of optical energy emitted by said light emitting means being reflected by said first and third reflective means to impinge upon the face of said recording medium opposite the face irradiated during the selective irradiation of said medium, and photodetector means responsive to light reflected by said recording medium with said first reflective means in said second pivotal position for reading out data stored on said recording medium.

2. An optical data storage and retrieval apparatus according to claim 1 wherein said light sensitive recording medium is a thermoplastic film and further including means for charging said thermoplastic recording medium prior to impinging controllably positioned optical energy thereon, said optical energy selectively discharging said thermoplastic recording medium to produce deformations corresponding to the selective discharge of said recording means upon subsequent development of said thermoplastic film by said developing means.

3. An optical data storage and retrieval apparatus according to claim 2 further including optical projector means, means for transporting said thermoplastic recording medium from said light emitting means to said optical projector means for illuminating said film in those areas wherein deformation images have been established and viewing screen means for displaying projected deformation images thereon.

4. An optical data storage and retrieval apparatus according to claim 3 wherein said transporting means include reversible drive means actuated in incremental steps equal in span to a whole multiple of a recorded frame of said thermoplastic recording medium, counter means for recording the number of actuations of said drive means and logic means for actuating said drive means in a reverse direction by a predetermined amount to dispose a selectively deformed frame of said thermoplastic recording medium at a location to receive optical energy from said light emitting means for readout of the information recorded thereon.

References Cited

UNITED STATES PATENTS

| | | | |
|---|---|---|---|
| 2,830,285 | 4/1958 | Davis et al. | 340—173 X |
| 3,179,924 | 4/1965 | Auyang et al. | 340—173 X |
| 3,274,565 | 9/1966 | Wright | 340—173 |
| 3,351,920 | 11/1967 | Harper et al. | 340—173 |

BERNARD KONICK, Primary Examiner

J. F. BREIMAYER, Assistant Examiner

U.S. Cl. X.R.

346—110